(12) United States Patent
Youn et al.

(10) Patent No.: US 8,605,641 B2
(45) Date of Patent: Dec. 10, 2013

(54) METHOD OF SUPPORTING A MULTICAST AND BROADCAST SERVICE IN WIRELESS ACCESS SYSTEM SUPPORTING RELAY

(75) Inventors: Ae Ran Youn, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 13/131,934

(22) PCT Filed: Dec. 3, 2009

(86) PCT No.: PCT/KR2009/007201
§ 371 (c)(1),
(2), (4) Date: May 31, 2011

(87) PCT Pub. No.: WO2010/074424
PCT Pub. Date: Jul. 1, 2010

(65) Prior Publication Data
US 2011/0235566 A1   Sep. 29, 2011

(30) Foreign Application Priority Data

Dec. 22, 2008   (KR) .................. 10-2008-0131351

(51) Int. Cl.
*H04H 20/71*   (2008.01)
*H04W 4/00*   (2009.01)
*H04W 72/00*   (2009.01)
*H04B 7/14*   (2006.01)

(52) U.S. Cl.
USPC ........ 370/312; 370/327; 370/315; 455/422.1; 455/452.2

(58) Field of Classification Search
None
See application file for complete search history.

(56) References Cited

U.S. PATENT DOCUMENTS

| | | |
|---|---|---|
| 2005/0152367 A1 | 7/2005 | Park et al. |
| 2008/0072269 A1* | 3/2008 | Malladi et al. ................ 725/110 |
| 2008/0212516 A1* | 9/2008 | Son et al. ...................... 370/315 |
| 2008/0285499 A1* | 11/2008 | Zhang et al. .................. 370/315 |
| 2008/0285500 A1* | 11/2008 | Zhang et al. .................. 370/315 |
| 2010/0069082 A1* | 3/2010 | Kim et al. .................. 455/452.2 |
| 2010/0120442 A1* | 5/2010 | Zhuang et al. ................ 455/450 |

FOREIGN PATENT DOCUMENTS

| | | |
|---|---|---|
| KR | 10-2008-0056070 A | 6/2008 |
| WO | WO 2007/097571 A1 | 8/2007 |
| WO | WO2008054149 * | 5/2008 |

* cited by examiner

*Primary Examiner* — Kevin C Harper
*Assistant Examiner* — Peter Chen
(74) *Attorney, Agent, or Firm* — Birch, Stewart, Kolasch & Birch, LLP

(57) ABSTRACT

A method of providing a multicast and broadcast service (MBS) in a multi-hop relay system is disclosed. The method of providing a multicast and broadcast service (MBS) in a multi-hop relay system comprises transmitting a first message including allocation information of a MBS zone; and providing the MBS from the MBS zone indicated by the allocation information. In this case, a downlink frame includes a downlink access zone, the MBS zone, and a downlink relay zone, and the MBS zone is allocated from the downlink frame used in a base station and a downlink frame used in a relay station at the same time.

13 Claims, 9 Drawing Sheets

METHOD OF SUPPORTING A MULTICAST AND BROADCAST SERVICE IN WIRELESS ACCESS SYSTEM SUPPORTING RELAY

TECHNICAL FIELD

The present invention relates to a wireless access system, and more particularly, to a system supporting a relay, and a method of supporting a multicast and broadcast service in a wireless access system.

BACKGROUND ART

It is expected that a relay station (RS) will be widely used in a wireless communication system for next generation. Hereinafter, the relay station (RS) will be described in brief.

A standardization project newly titled multi-hop relay is being in progress in the IEEE (Institute of Electrical and Electronics Engineers) 802.16 of 2006 since the standard IEEE 802.16-2004 based on fixed subscriber mobile stations and the standard IEEE 802.16e-2005 for providing mobility of a subscriber mobile station.

This standardization project handled by a task group j (IEEE 802.16j) of the IEEE 802.16 has discussed usage models, terminologies, and technical requirements in the second conference in July, 2006 since the first conference in May, 2005. Hereinafter, the IEEE 802.16 task group j will be abbreviated as "802.16j".

The relay station to be described hereinafter will substantially be the same as a relay station considered by a 3GPP IMT-A (LTE-A) system. Also, a relay station that performs same or similar functions in various wireless access systems will be used similarly to the relay station described herein.

Project authorization request (PAR) of the 802.16j has two standardization tasks, i.e., coverage extension and throughput enhancement.

A network that uses a relation station includes a base station (BS), a relay station (RS), and a mobile station (MS). The mobile station can receive a radio signal through the relay station even outside a cell zone of the base station. Also, a mobile station located within the cell zone of the base station can establish a path of high quality, which has an adaptive modulation and coding (AMC) scheme of high level through the relay station. Accordingly, a user can obtain enhancement effect of overall system capacity through the same radio resource.

The standard to be made by the 802.16j project has predetermined requirements. For example, a mobile station based on the existing 802.16-2004 and 802.16e-2005 standards should perform communication with the relay station without additional function. Accordingly, an application range of the relay station can be limited to the existing system in such a manner that some functions for controlling the relay station are added to the relay station and the existing base station. It is expected that the standard of the relay station will serve as a main factor of the standardization The relay station could be regarded as a subscriber mobile station that performs operations of a physical layer and a medium access control layer. Although the relay station is mainly controlled by the base station, it may have a predetermined control function if necessary. Various relay stations will be considered as usage models which are currently discussed, and their examples include a fixed relay station, a mobile relay station for providing a temporary service to a specific zone, and a relay station that can be built in a car or subway.

Main technical issues which will be discussed later are as follows:
1. a procedure of identifying relay stations that exist in an zone of a base station and acquiring and maintaining information of a topology with the relay stations;
2. definition of a structure of a physical transport frame between a relay station and a mobile station having backward compatibility with the existing IEEE 802.16 system;
3. a signal procedure for providing mobility between relay stations or between a relay station and a base station; and
4. a network entry procedure of a relay station to a base station and a network entry procedure of a mobile station through a relay station.

Hereinafter, a structure of a general frame used in a wireless access system will be described.

FIG. 1 is a diagram illustrating a frame structure used in a broadband wireless access system (for example, IEEE 802.16).

Referring to FIG. 1, a horizontal axis of a frame is a time unit and represents orthogonal frequency division multiple access (OFDMA) symbols, and its vertical axis is a frequency unit and represents physical numbers of a subchannel. In FIG. 1, one frame is divided into data sequence channels for a certain time period by physical characteristics. In other words, one subframe includes a downlink subframe and an uplink subframe.

At this time, the downlink subframe may include a preamble, a frame control header (FCH), a downlink map (DL-MAP), an uplink map (UL-MAP), and one or more data bursts. Also, the uplink subframe can include one or more uplink data bursts and a ranging subchannel.

In FIG. 1, the preamble is specific sequence data located in a first symbol of each frame and is used so that the mobile station synchronizes with the base station or estimates a channel. The FCH is used to provide channel allocation information related to the DL-MAP and information of channel code. The DL-MAP/UL-MAP are medium access control (MAC) messages used by the downlink/uplink to indicate channel resource allocation to the mobile station. Also, the data burst represents a unit of data intended to be transmitted from the base station to the mobile station or from the mobile station to the base station.

A downlink channel descriptor (DCD) that can be used in FIG. 1 represents a MAC message for indicating physical characteristics of a downlink channel, and an uplink channel descriptor (UCD) represents a MAC message for indicating physical characteristics of an uplink channel.

In case of the downlink, referring to FIG. 1, the mobile station synchronizes with the base station by detecting the preamble transmitted from the base station. Afterwards, the mobile station can decode the downlink map using information acquired from the frame control header (FCH). The base station can transmit scheduling information for downlink or uplink resource allocation to the mobile station per frame (for example, 5 ms) using a downlink or uplink map (DL-MAP/UL-MAP) message.

Hereinafter, a multicast and broadcast service (MBS) will be described in brief.

A system for a multicast and broadcast service (MBS) includes a MBS media server, a MBS distribution server, one or more base stations (BS), and one or more mobile stations (MS).

The mobile station is a common designation of electronic devices that can perform wireless communication with the base station, and designates a comprehensive term that includes devices having mobility, such as mobile terminal. The MBS media server provides MBS data to the base stations, and performs authentication and encryption key distribution of the mobile station for MBS media. The MBS distribution server handles scheduling of MBS data transferred to a plurality of base stations. Selectively, the MBS distribution server may be omitted. Instead, the MBS media server may perform scheduling of MBS data. The base station provides the MBS data, which are transferred through a backbone network, to the mobile station through a radio interface, and the mobile station receives the MBS data from the base station.

The MBS can be divided into two types. The first type is a single-BS access type served by one base station within one cell. The second type is a multi-BS access type that several base stations constitute one MBS zone to provide the same MBS.

According to the single-BS access type, one base station equally grants random ID of connection IDs, which are allocated from one base station to multi-cast, to all mobile stations intended to receive MBS data, thereby transmitting the MBS data. According to the multi-BS access type, several base stations belonging to one MBS zone provide a multicast service to mobile stations the same multicast CID.

The multi-BS access type allows several cells within the same MBS zone to provide the same MBS to the mobile station, so that the mobile station can receive the MBS service without handover even in case of movement between cells within the MBS zone. Namely, the mobile station can obtain service continuity and macro-diversity gain.

DISCLOSURE OF INVENTION

Technical Problem

Generally, in a frame structure (particularly, if a frame includes a uni-directional zone) for supporting a multi-hop relay, an odd-hop RS is operated in a transmission mode for a downlink access zone of a base station, whereas an even-hop RS can be operated in a reception mode.

For this reason, a frame structure in view of a relay station may be different from a frame structure in view of a base station. Also, the frame structure can be varied within the relay station depending on the number of hops (for example, odd-hop or even-hop).

In this case, a problem may occur in that the base station, the odd-hop RS and the even-hop RS share the same resource at the same time, whereby MBS cannot be transmitted to a mobile station.

Accordingly, the present invention has been devised to solve the aforementioned technical problems, and an object of the present invention is to provide a method of efficiently providing a multicast and broadcast service (MBS).

Another object of the present invention is to provide a method of relaying a MBS, which is broadcasted from a base station, in a relay station and receiving the MBS in a mobile station.

Still another object of the present invention is to provide a method of efficiently providing a MBS from a base station or a relay station to a mobile station in a wireless access system that supports a multi-hop relay.

Further still another object of the present invention is to provide a method of defining a MBS zone for supporting a MBS and providing the MBS through the MBS zone if frame structures used between a base station and a relay station or between relay stations are different from each other.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To solve the aforementioned technical problems, the present invention discloses a method and apparatus of providing a multicast and broadcast service (MBS) in a system that supports a relay.

In one aspect of the present invention, a method of providing a multicast and broadcast service (MBS) in a multi-hop relay system comprises transmitting a first message including allocation information of a MBS zone; and providing the MBS from the MBS zone indicated by the allocation information. In this case, a downlink frame includes a downlink access zone, the MBS zone, and a downlink relay zone, and the MBS zone is allocated from the downlink frame used in a base station and a downlink frame used in a relay station at the same time.

The allocation information includes an offset field indicating the difference between a beginning of a specific frame and a beginning of the MBS zone, a field of the number of symbols allocated to the MBS zone, and a field of the number of subchannels allocated to the MBS zone.

The allocation information includes a MBS subframe field indicating a subframe where the MBS zone begins, and a field of the number of subchannels allocated to the MBS zone.

The allocation information includes a frame number field indicating a frame including the MBS zone, and a subframe number field indicating a subframe where the MBS zone is allocated.

The method further comprises receiving a response message from the relay station in response to the allocation information, the response message including information as to whether the MBS zone can be used and delay time information of the MBS zone.

The method, if the MBS zone is changed, further comprises transmitting a second message including changed allocation information of the changed MBS zone. Also, the method further comprises providing the MBS to the relay station through a MBS zone indicated by the changed allocation information. In this case, the method further comprises receiving an acknowledgement signal to the second message from the relay station.

In another aspect of the present invention, a method of providing a multicast and broadcast service (MBS) in a relay station that supports a multi-hop relay comprises receiving a first message in the relay station from a base station, the first message including allocation information of a first MBS zone; receiving the MBS in the first MBS zone indicated by the allocation information from the first MBS zone; and relaying the MBS to the mobile station in the first MBS zone indicated by the allocation information. In this case, a downlink frame used in the relay station includes a downlink transmit zone, the first MBS zone, a downlink receive zone, and a gap, and the first MBS zone is allocated from a downlink frame used in a base station and the downlink frame used in the relay station at the same time.

The method further comprises transmitting a response message to the base station in response to the first message, the response message including information as to whether the first MBS zone can be used and delay time information of the first MBS zone.

The method, if the base station changes the first MBS zone to a second MBS zone, further comprises receiving a second message from the base station, the second message including allocation information of the second MBS zone.

The method further comprises receiving the MBS from the base station through the second MBS zone; and relaying the MBS to the mobile station through the second MBS zone.

The allocation information includes an offset field indicating the difference between a beginning of a specific frame and a beginning of the first MBS zone, a field of the number of symbols allocated to the first MBS zone, and a field of the number of subframes allocated to the first MBS zone.

The allocation information includes a first MBS subframe field indicating a subframe where the first MBS zone begins, and a field of the number of subframes allocated to the first MBS zone.

The allocation information includes a frame number field indicating a frame including the first MBS zone, and a subframe number field indicating a subframe where the first MBS zone is allocated.

In other aspect of the present invention, a mobile station comprises a processor; a receive module; a transmit module; and an antenna transmitting a radio signal received from the outside to the receive module and transmitting a radio signal, which is transferred from the transmit module, to the outside. In this case, the receive module performs demodulation and decoding for the radio signal transferred from the antenna, and the transmit module performs modulation and coding for the data transferred from the processor. Also, the processor controls the receiving module to receive a first message including allocation information of the MBS zone from a base station to allow a MBS transmitting side to determine a MBS zone for transmitting MBS data, and to receive the MBS data from the MBS transmitting side through the MBS zone indicated by the received allocation information.

The MBS transmitting side includes the base station and the relay station.

A downlink frame of the relay station includes a downlink access zone, the MBS zone, and a downlink relay zone, and the MBS zone is allocated from a downlink frame used in the base station and the downlink frame used in the relay station at the same time.

The allocation information includes an offset field indicating the difference between a beginning of a specific frame and a beginning of the MBS zone, a field of the number of symbols allocated to the MBS zone, and a field of the number of subchannels allocated to the MBS zone.

The allocation information includes a frame number field indicating a frame including the MBS zone, and a subframe number field indicating a subframe where the MBS zone is allocated.

If the MBS zone is changed, the processor further receives a second message including changed allocation information of the changed MBS zone from the base station by controlling the receive module, and receives the MBS data through a MBS zone indicated by the changed allocation information.

In the embodiments of the present invention, each of the first message and the second message is one of a preamble, a broadcast channel, a super frame header, and a system information message.

The aforementioned embodiments are only a part of the preferred embodiments of the present invention, and various embodiments reflecting technical features of the present invention will be understood by the person with ordinary skill in the art based on the detailed description of the present invention.

Advantageous Effects

According to the embodiments of the present invention, the following advantages can be obtained.

First, a base station can efficiently provide a multicast and broadcast service (MBS) to a relay station and a mobile station.

Second, in a wireless access system that supports a multi-hop relay, the base station or the relay station can efficiently provide a MBS to the mobile station or a subordinate relay station.

Third, if frame structures used between a base station and a relay station or between relay stations are different from each other, a MBS zone for supporting the MBS can be provided. Also, the MBS can be provided through the MBS zone.

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Figure 1:
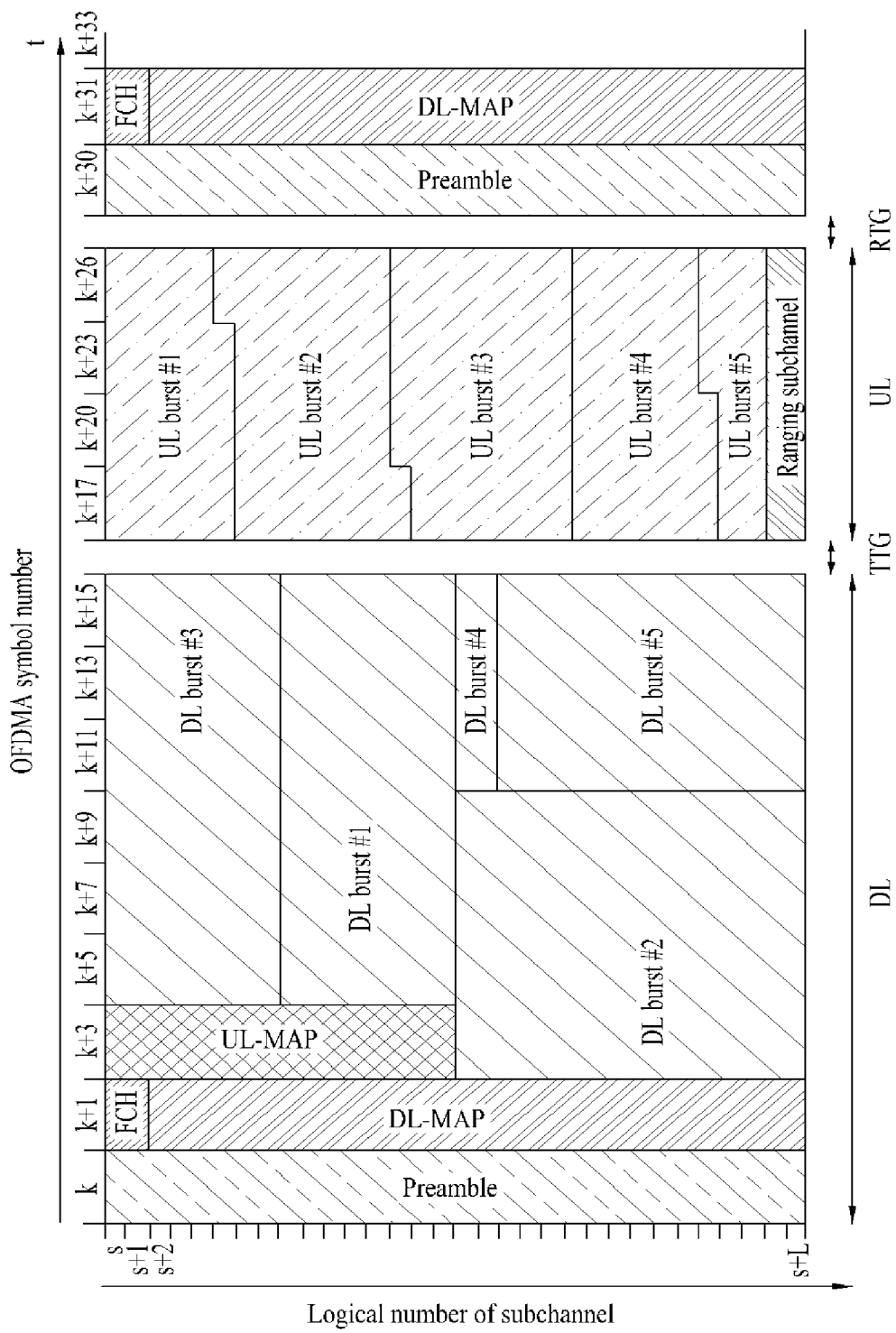
FIG. 1 is a diagram illustrating a frame structure used in a broadband wireless access system (for example, IEEE 802.16)

The present invention relates to a wireless access system. Hereinafter, the embodiments of the present invention described hereinafter relate to a system that supports a relay, and disclose a method and apparatus of providing a multicast and broadcast service (MBS).

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will not be described, and procedures or steps that can be understood by the person with ordinary skill in the art will not be described.

The embodiments of the present invention have been described based on the data transmission and reception between a base station and a mobile station. In this case, the base station means a terminal node of a network that performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station can be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a mobile terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the method according to the embodiments of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, in the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

Figure 2:
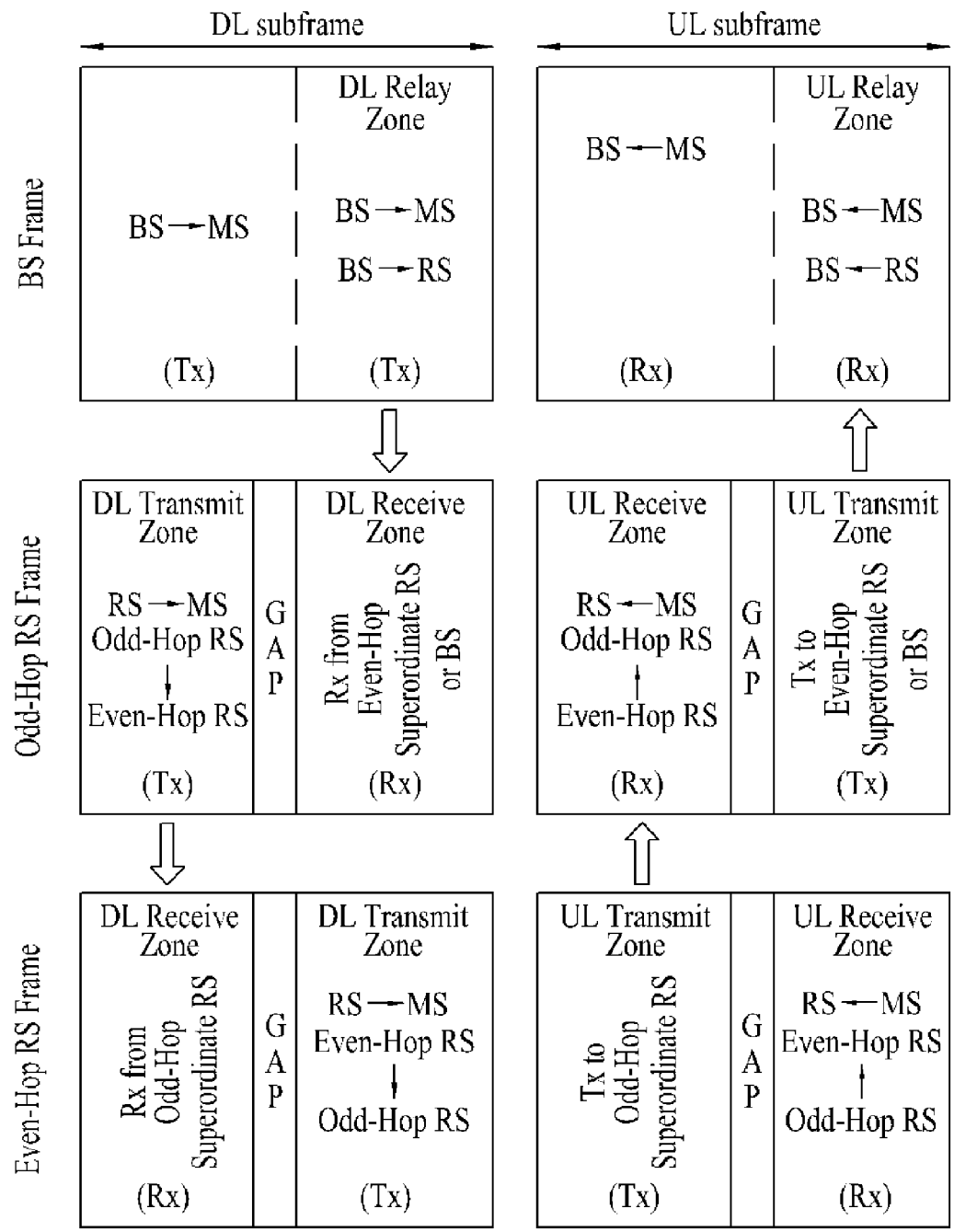
FIG. 2 is a diagram illustrating an example of a uni-directional frame structure that can be used in the embodiments of the present invention.

FIG. 2 is a diagram illustrating an example of a uni-directional relay frame structure that can be used in the embodiments of the present invention.

In the embodiments of the present invention, a relay station (RS) can be divided into an odd-hop RS and an even-hop RS depending on the number of hops with a base station BS. The odd-hop RS and the even-hop RS can have a layer structure, and one network can include one or more odd-hop relay stations RS and one or more even-hop relay stations RS.

A frame structure used in the base station includes a downlink frame structure and an uplink frame structure. In this case, the downlink frame structure includes a downlink (DL) access zone and a DL relay zone while the uplink frame structure includes a UL access zone and a UL relay zone.

The downlink access zone represents an interval where the base station BS transmits data packets to the mobile station MS while the uplink access zone represents an interval where the mobile station MS transmits data packets to the base station BS. Also, in the downlink relay zone, the base station BS can relay data packets to the mobile station or the relay station RS. In the uplink relay zone, the mobile station MS or the relay station RS can relay data packets to the base station BS.

The frame structure used in the odd-hop RS includes a transmit zone and a receive zone. For example, the downlink includes a DL transmit zone and a DL receive zone. Also, the uplink includes a UL receive zone and a UL transmit zone.

The odd-hop RS can relay and transmit data packets to the mobile station or a subordinate RS (for example, even-hop RS) in the downlink transmit zone. Also, the odd-hop RS can receive the data packets relayed from the subordinate RS (for example, even-hop relay) in the downlink receive zone.

The odd-hop RS can receive the data packets relayed from the mobile station MS or the subordinate RS (or even-hop RS) in the uplink receive zone. Also, the odd-hop RS can transmit the data packets relayed from the subordinate RS or the mobile station to a superordinate RS (or base station) in the uplink transmit zone.

The frame structure used in the even-hop RS includes a transmit zone and a receive zone. For example, the uplink includes a DL transmit zone and a DL receive zone. Also, the uplink includes a UL receive zone and a UL transmit zone.

In this case, the frame structure used in the even-hop RS is similar to the frame structure used in the odd-hop RS. However, in case of the even-hop RS, the superordinate RS could be the odd-hop RS, and the subordinate RS could be the mobile station or another odd-hop RS.

Figure 3:
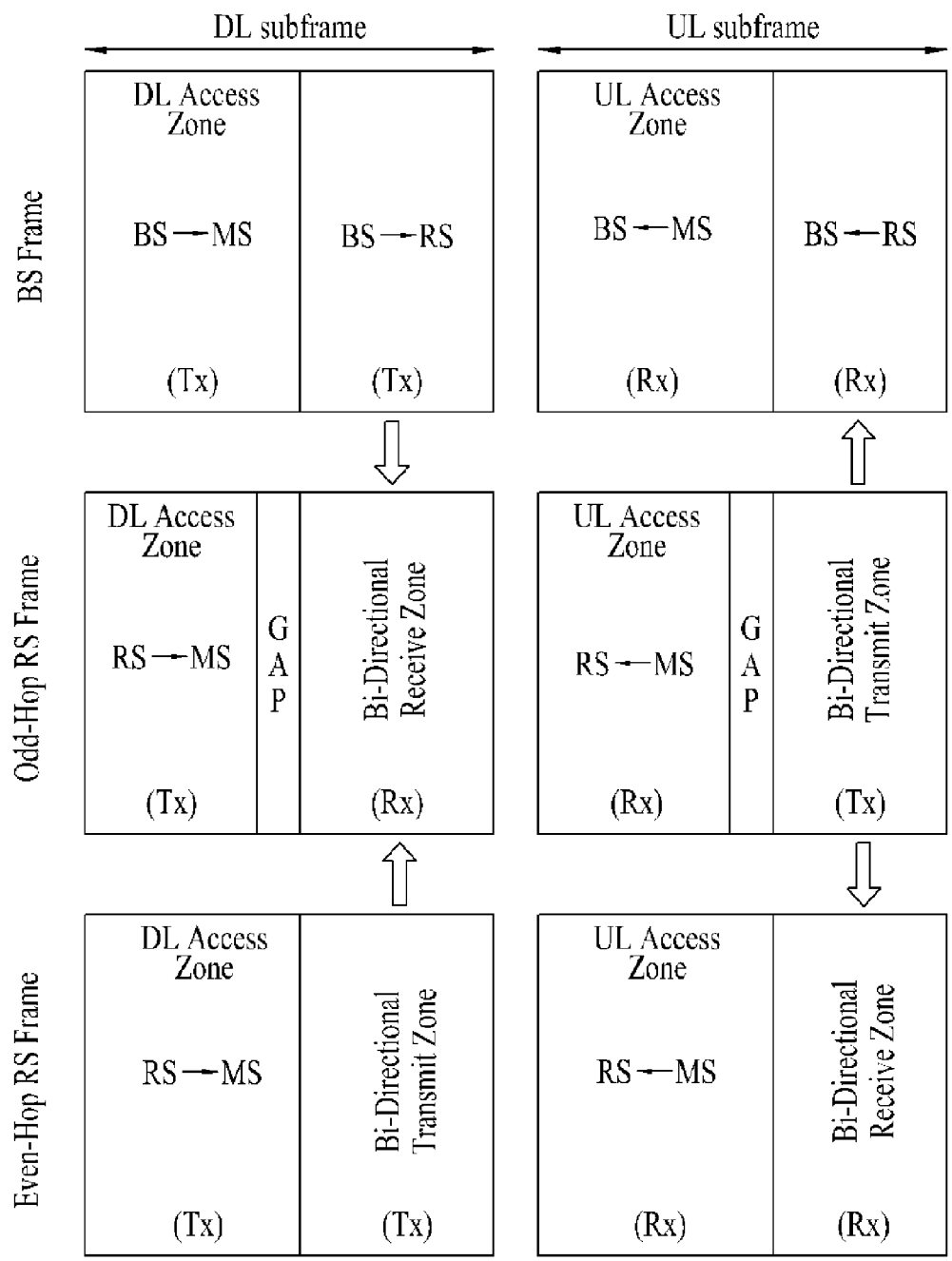
FIG. 3 is a diagram illustrating an example of a bi-directional relay frame structure that can be used in the embodiments of the present invention.

FIG. 3 is a diagram illustrating an example of a bi-directional relay frame structure that can be used in the embodiments of the present invention.

FIG. 3 is different from FIG. 2 in that a bidirectional transmit zone and a bidirectional receive zone exist in FIG. 3. In FIG. 3, the frame structure used in the base station includes a downlink subframe and an uplink subframe. In this case, the downlink subframe includes a downlink access zone and a downlink relay zone. Also, the uplink subframe includes an uplink access zone and an uplink relay zone.

At this time, the base station can transmit data packets to the mobile station in the downlink access zone. Also, the base station can relay the data packets to the relay station in the downlink relay zone. Furthermore, the base station can receive the data packets from the mobile station in the uplink access zone, and receive the relayed data packets from the relay station.

The frame structure used in the odd-hop RS includes a downlink access zone, a downlink bi-directional receive zone, an uplink access zone, and an uplink bi-directional transmit zone. In this case, a gap zone can be included between the downlink access zone and the bi-directional receive zone and between the uplink access zone and the bi-directional transmit zone as a protective interval.

The frame structure used in the even-hop RS includes a downlink access zone, a downlink bi-directional transmit zone, an uplink access zone, and an uplink bi-directional receive zone.

The bi-directional transmit zone is a transmission interval of the odd-hop RS or the even-hop RS and can transmit the relayed data packets to the superordinate RS or the subordinate RS. Also, the bi-directional receive zone can receive the relayed data packets from the odd-hop RS or the even-hop RS.

In FIG. 3, the downlink access zone represents an interval where the base station transmits data packets to the mobile station or the relay station transmits the relayed data packets to the mobile station. Also, the uplink access zone represents an interval where the mobile station transmits data packets to the base station or the mobile station transmits the data packets to the odd-hop RS or the even-hop RS.

The frame structures shown in FIG. 2 and FIG. 3 represent that a TDD is supported within one frame of a period of 5 msec. The frame structures of FIG. 2 and FIG. 3 can be applied to an FDD, and can be interpreted as TDD/FDD mode operations of a plurality of frames. Also, the respective zones can be established in a unit of subframe for a frame that includes one or more subframes or in a unit of frame for one or more frames.

The multicast and broadcast service (MBS) can be divided into a single-BS MBS and a multi-BS MBS depending on a service access mode of the mobile station. The single-BS MBS represents that the mobile station receives a MBS from one base station. The multi-BS MBS represents that the mobile station can simultaneously receive a MBS from two or more base stations.

Hereinafter, a method of defining a MBS zone for supporting a MBS in a wireless access system supporting a multi-hop relay and receiving the MBS from the MBS zone in a mobile station that communicates with a base station and a separate relay station will be described in detail.

Figure 4:
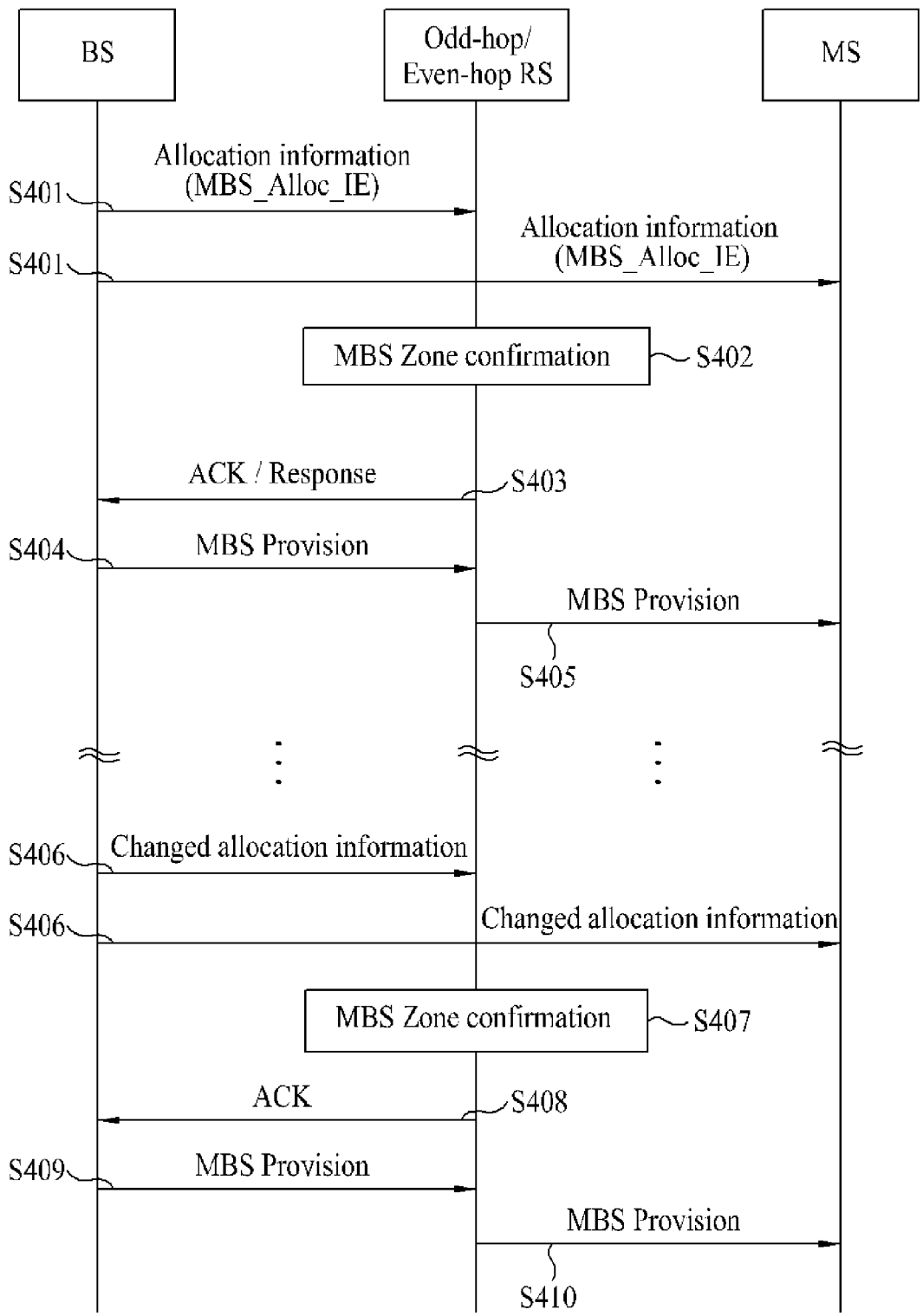
FIG. 4 is a diagram illustrating one of methods of providing a MBS to a relay station and a mobile station in accordance with one embodiment of the present invention.

FIG. 4 is a diagram illustrating one of methods of providing a MBS to a relay station and a mobile station in accordance with one embodiment of the present invention.

FIG. 4 illustrates a method of allocating a MBS zone when a base station does not manage all radio resources of a relay station. Namely, FIG. 4 illustrates a case (e.g., distributed scheduling) where a relay station independently uses a specific resource zone.

Referring to FIG. 4, the base station allocates a transmit zone for transmitting a MBS. For example, if a frame structure used between the base station and the relay station RS is different from that used between separate relay stations, the base station can set the same time and zone in all relay stations as a transmit zone for transmitting a MBS.

The base station can transmit MBS zone allocation information (for example, MBS_Alloc_IE), which is allocated to transmit a MBS, to one or more of relay stations (odd-hop RS and/or even-hop RS) and the mobile station. At this time, the base station can transmit the MBS zone allocation information using multicast connection identifier (CID) or broadcast CID (S401).

The allocation information (MBS_Alloc-IE) for allocating a MBS zone includes information of offset and a size of the MBS zone based on a beginning time of a frame (or subframe) or information of a beginning frame (or subframe) and a size of the MBS zone.

The following Table 1 illustrates an example of a MBS_Alloc-IE format used in step S401.

TABLE 1

| Name | Size (bits) | Note |
| --- | --- | --- |
| MBS_Alloc-IE( ){ | — | |
| MBS region Offset | 8 | |
| No. OFDMA Symbols | 8 | |
| No. Subchannels | 8 | |
| } | — | |

Referring to Table 1, the MBS zone allocation information MBS_Alloc-IE includes a MBS region offset indicating a beginning time of the MBS zone, the number of OFDMA symbols (No. OFDMA symbols) allocated for the MBS zone, and the number of subchannels allocated for the MBS zone. In other words, the relay station and the mobile station can identify offset from the beginning of a corresponding frame (or subframe) to a MBS beginning zone and a size of the MBS zone if they receive the MBS zone allocation information MBS_Alloc-IE.

The following Table 2 illustrates another example of a MBS_Alloc-IE format used in step S401.

TABLE 2

| Name | Size (bits) | Note |
| --- | --- | --- |
| MBS_Alloc-IE( ){ | — | |
| Start MBS Subframe | 3 | |
| No. Subframe | 3 | |
| } | — | |

Referring to Table 2, the MBS zone allocation information MBS_Alloc-IE includes a start MBS subframe parameter where the MBS zone starts and the number of subframes (No. Subframe) allocated for the MBS zone. Table 2 can be used when specific subframes are all used as the MBS zone. Also, if one or subframes are included in a specific frame, the MBS zone can be represented by a subframe number and the number of subframes.

The following Table 3 illustrates other example of a MBS_Alloc-IE format used in step S401.

TABLE 3

| Name | Size (bits) | Note |
| --- | --- | --- |
| MBS_Alloc-IE( ){ | — | |
| Frame Number | 4 | |
| Subframe Number | 3 * 4 | |
| } | — | |

Referring to Table 3, the MBS zone allocation information MBS_Alloc-IE includes a frame number field indicating a number of a frame where the MBS zone is allocated and a subframe number field indicating a number of a subframe where the MBS zone is allocated. At this time, the frame number field indicates the beginning (symbol) where a superframe starts in a unit of frame included in the superframe, and the superframe number field indicates the order of subframes calculated from the time when the frame starts.

For example, if the frame number field is a size of 4 bits, "1100", it can indicate that the MBS zone exists in the first and second frames. Also, if the frame number field is "101/010/000/000", it can indicate that the MBS zone is allocated to the fifth subframe of the first frame and the second subframe of the second frame.

In the embodiments of the present invention, the MBS zone allocation information MBS_Alloc-IE of Table 1 to Table 3 can be included in one of a super frame header (SFH), a broadcast channel (BCH), and system information and then transmitted to the relay station and/or the mobile station.

The relay station (odd-hop RS and/or even-hop RS) identifies whether the zone allocated from the base station can be used for the MBS, if allocation information of the MBS zone is allocated from the base station. The relay station calculates a delay time for simultaneously implementing the base station and the MBS through the MBS allocated from the base station (S402).

Accordingly, the relay station can transmit a message (for example, response message or ACK), which includes information as to whether the MBS zone is used and delay time information, to the base station (S403).

The base station can provide the MBS simultaneously with the relay station by receiving the information as to whether the MBS zone is used and the delay time information. The base station provides the MBS to the relay station through the MBS zone allocated in step S401 (S404), the relay station provides the MBS to the mobile station through the MBS zone allocated from the base station. As a result, the base station and the relay station can provide the MBS to the mobile station at the same time (S405).

The base station may need to the MBS zone depending on user's requirements or radio status in providing a service. In this case, the base station may allocate a new MBS zone to the relay station and the mobile stations or change the existing MBS zone. Accordingly, the base station can change the MBS zone and transmit MBS allocation information of the changed MBS zone to the relay station (odd-hop RS and even-hop RS) or the mobile station. At this time, the MBS allocation information of the changed MBS zone can be transmitted to the relay station or the mobile station through the SFH, the BCH or system information (S406).

The relay station identifies the changed MBS zone if the changed allocation information is received (S407), and transmits an acknowledgement (ACK) message to the change MBS zone to the base station (S408).

The steps S407 and S408 are similar to the step S402 and S403.

The base station provides the MBS to the relay station and/or the mobile station through the changed MBS zone after receiving the ACK from the relay station, and the relay station provides the MBS to the mobile station through the changed MBS zone (S410).

Figure 5:
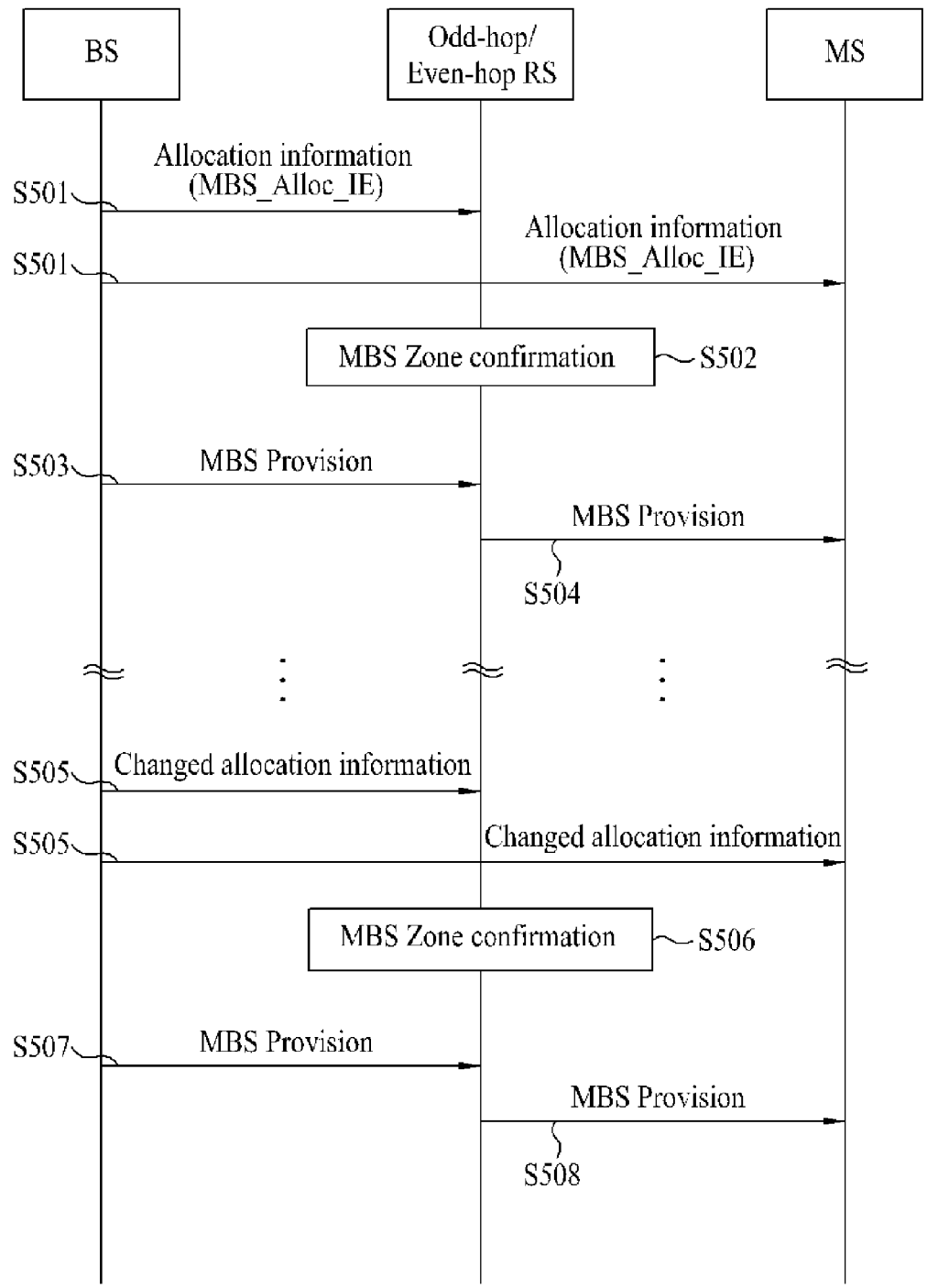
FIG. 5 is a diagram illustrating the other one of methods of providing a MBS to a relay station and a mobile station in accordance with one embodiment of the present invention.

FIG. 5 is a diagram illustrating the other one of methods of providing a MBS to a relay station and a mobile station in accordance with one embodiment of the present invention.

FIG. 5 illustrates a method of allocating a MBS zone when a base station manages all radio resources of a relay station. Namely, FIG. 5 illustrates a case where a relay station constitutes a relay frame by depending on a base station. It is assumed that allocation information used in FIG. 5 is identical with that used in FIG. 4.

Referring to FIG. 5, the base station allocates a transmit zone for transmitting a MBS. A frame structure used between the base station and the relay station RS may be different from that used between separate relay stations. In this case, all relay stations can allocate the same MBS transmission time and the same MBS zone as those of the base station.

The base station can transmit MBS zone allocation information (for example, MBS_Alloc_IE), which is allocated to transmit a MBS, to one or more of relay stations (odd-hop RS and/or even-hop RS) and the mobile station (S501).

The allocation information (MBS_Alloc-IE) for allocating a MBS zone includes information of offset and a size of the MBS zone based on a beginning time of a frame (or subframe) or information of a beginning frame (or subframe) and a size of the MBS zone. At this time, for the allocation information MBS_Alloc-IE, refer to Table 1 to Table 3.

In the embodiments of the present invention, the MBS zone allocation information MBS_Alloc-IE can be included in one of a super frame header (SFH), a broadcast channel (BCH), and system information and then transmitted to the relay station and/or the mobile station.

The relay station (odd-hop RS and/or even-hop RS) identifies whether the zone allocated from the base station can be used for the MBS, if allocation information of the MBS zone is allocated from the base station. The relay station calculates a delay time for simultaneously implementing the base station and the MBS through the MBS allocated from the base station (S502).

In FIG. 5, since the relay station manages a frame structure under the control of the base station, unlike FIG. 4, the relay station does not need to transmit a message, which includes information as to whether the MBS zone is used and delay time information, to the base station.

Accordingly, the base station provides the MBS to the relay station through the MBS zone allocated to the relay station and the mobile station in step S501, and the relay station provides the MBS to the mobile station through the MBS zone allocated from the base station. As a result, the base station and the relay station can provide the MBS to the mobile station at the same time (S504).

The base station may need to the MBS zone depending on user's requirements or radio status in providing a service. In this case, the base station may allocate a new MBS zone to the relay station and the mobile stations or change the existing MBS zone. Accordingly, the base station can change the MBS zone and transmit MBS allocation information of the changed MBS zone to the relay station (odd-hop RS and even-hop RS) or the mobile station. At this time, the MBS allocation information of the changed MBS zone can be transmitted to the relay station or the mobile station through the SFH, the BCH or system information (S505).

The relay station identifies the changed MBS zone if the changed allocation information is received (S506). The base station provides the MBS to the relay station and/or the mobile station through the changed MBS zone (S507), and the relay station provides the MBS to the mobile station through the changed MBS zone (S508).

Figure 6:
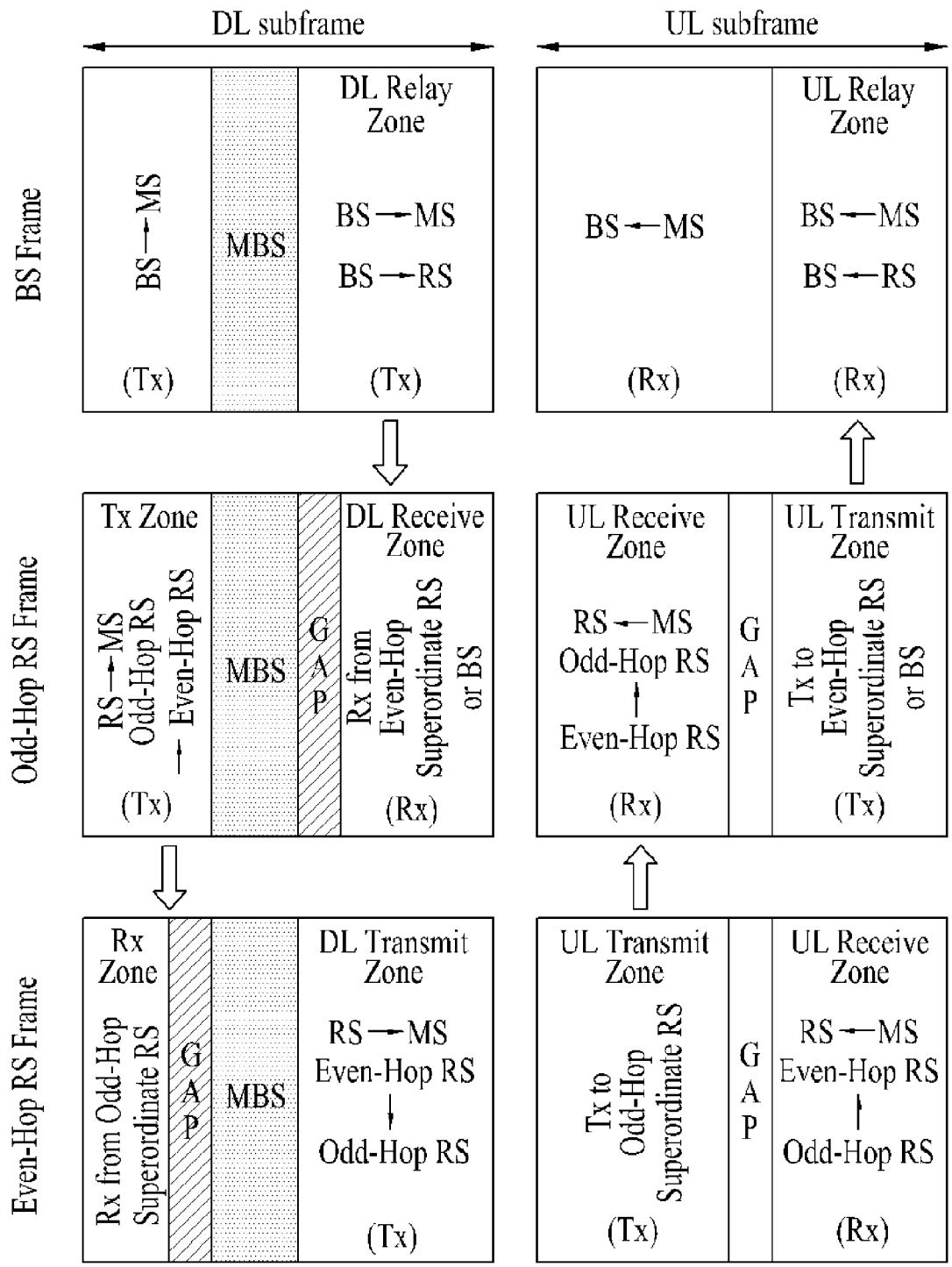
FIG. 6 is a diagram illustrating an example of a relay frame structure, which includes a MBS zone, in a system that supports a multi-hop relay, in accordance with another embodiment of the present invention.

FIG. 6 is a diagram illustrating an example of a relay frame structure, which includes a MBS zone, in a system that supports a multi-hop relay, in accordance with another embodiment of the present invention.

The frame structure of FIG. 6 includes a downlink (DL) subframe and an uplink (UL) subframe. In this case, the uplink subframe structure is the same as that of FIG. 2. However, the downlink subframe structure is different from that of FIG. 2 in that a MBS zone for a MBS is allocated. Hereinafter, the relay frame structure based on the downlink subframe will be described.

Referring to FIG. 6, the downlink subframe used in the base station includes a downlink (DL) access zone, a MBS zone, and a downlink (DL) relay zone.

The base station can transmit data to the mobile station in the downlink access zone, and can transmit data to the mobile station or the relay station in the downlink relay zone. Also, the base station can broadcast the MBS to the relay station or the mobile station in the MBS zone.

In FIG. 6, the downlink subframe used in the odd-hop RS includes a DL Tx zone, a MBS zone, a gap, and a DL receive zone. In the embodiments of the present invention, if the MBS zone is allocated, a predetermined gap is required before and after the MBS zone. Of course, the gap may not be used depending on user's requirements or communication status.

In the downlink subframe used in the odd-hop RS, after the MBS zone is allocated, the DL Rx zone is allocated. In this case, a predetermined gap zone is required between the MBS zone and the DL receive zone. This is because that a delay time for converting a transmission mode of the relay station to a reception mode is required, wherein the transmission mode is for providing a MBS and the reception mode is for receiving DL data.

In the downlink subframe used in the even-hop RS, the MBS zone is allocated to the DL receive zone. Accordingly, if the DL receive zone is converted to the MBS zone, a predetermined gap is required. If the MBS zone is converted to the DL receive zone, since the same transmission mode is allocated, the gap zone is not required. Of course, the gap may be allocated between the MBS zone and the DL transmit zone depending on user's requirements or communication status.

In the embodiments of the present invention, it has been described that the gap is allocated if the relay station is converted from the transmission mode to the reception mode or from the reception mode to the transmission mode. In this case, the gap can be allocated to the last OFDM symbol of the transmit zone and/or the receive zone.

For example, in case of the odd-hop RS, the gap for conversion to the reception mode can exist in the MBS zone before the start symbol of the downlink Rx zone. Also, in case of the even-hop RS, the gap can exist at the time when the DL receive zone is converted to the MBS zone. In the frame used by the relay station in the uni-directional relay system, the gap is a conversion time for conversion of the reception mode and the transmission mode, and the relay station can be operated in an idle mode or mute mode in the gap.

Figure 7:
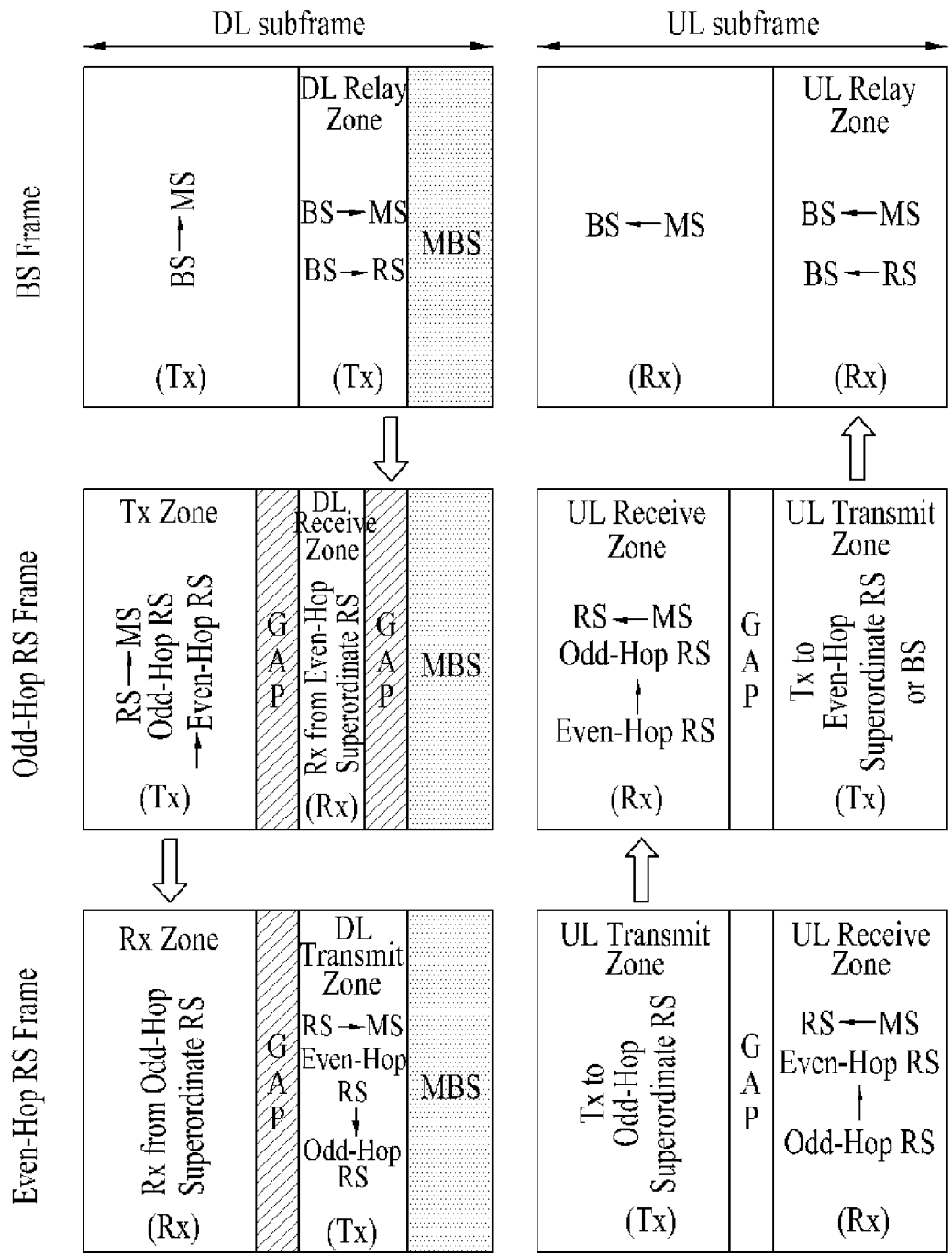
FIG. 7 is a diagram illustrating another example of a relay frame structure that includes a MBS zone in a system that supports a multi-hop relay, in accordance with another embodiment of the present invention.

FIG. 7 is a diagram illustrating another example of a relay frame structure that includes a MBS zone in a system that supports a multi-hop relay, in accordance with another embodiment of the present invention.

The frame structure of FIG. 7 includes a downlink (DL) subframe and an uplink (UL) subframe. In this case, the uplink subframe structure is the same as that of FIG. 2. However, the downlink subframe structure is different from that of FIG. 2 in that a MBS zone for a MBS is allocated. Hereinafter, the relay frame structure based on the downlink subframe will be described.

Referring to FIG. 7, the downlink subframe used in the base station includes a downlink (DL) access zone, a downlink (DL) relay zone, and a MBS zone. At this time, FIG. 7 illustrates that the MBS zone is allocated to the rear of the downlink subframe.

The base station can transmit data to the mobile station in the downlink access zone, and can transmit data to the mobile station or the relay station in the downlink relay zone. Also, the base station can broadcast the MBS to the relay station or the mobile station in the MBS zone.

In FIG. 7, the downlink subframe used in the odd-hop RS includes a DL Tx zone, a gap, a DL receive zone, and a MBS zone. In the embodiments of the present invention, if the MBS zone is allocated, a predetermined gap is required before and after the MBS zone. Of course, the gap may not be used depending on user's requirements or communication status.

In the downlink subframe used in the odd-hop RS, a predetermined gap is allocated between the DL transmit zone and the DL receive zone. This is because that a delay time for converting a transmission mode of the relay station to a reception mode is required, wherein the transmission mode is for providing a MBS and the reception mode is for receiving DL data.

The downlink subframe used in the even-hop RS includes a DL receive zone, a gap, a DL transmit zone, and a MBS zone. Accordingly, if the DL receive zone is converted to the DL transmit zone in the downlink subframe, a predetermined gap is required. If the MBS zone is converted to the DL transmit zone, since the same transmission mode is allocated, a gap zone is not required. Of course, the gap may be allocated between the MBS zone and the DL transmit zone depending on user's requirements or communication status.

In FIG. 6 and FIG. 7, it has been described that the uni-directional relay system has been described. However, the downlink frame structure described in FIG. 6 and FIG. 7 can also be applied to the bi-directional relay system. For example, in FIG. 3, the base station can allocate a predetermined MBS zone to the downlink subframe. At this time, if the transmission mode is converted to the reception mode or vice versa, a predetermined gap for the conversion time is required. However, the base station can allocate the MBS zone to the uplink subframe.

Generally, it is considered that the base station BS and the relay station RS transmit the same MBS data at the same time. Accordingly, the base station previously transmits MBS data to the relay station, wherein the MBS data are intended to be transmitted from the relay station, and the relay station determines the MBS transmission time by negotiating MBS delay and transmission time with the base station. As a result, the base station and the relay station can provide the MBS data to the mobile station at the same time.

Figure 8:
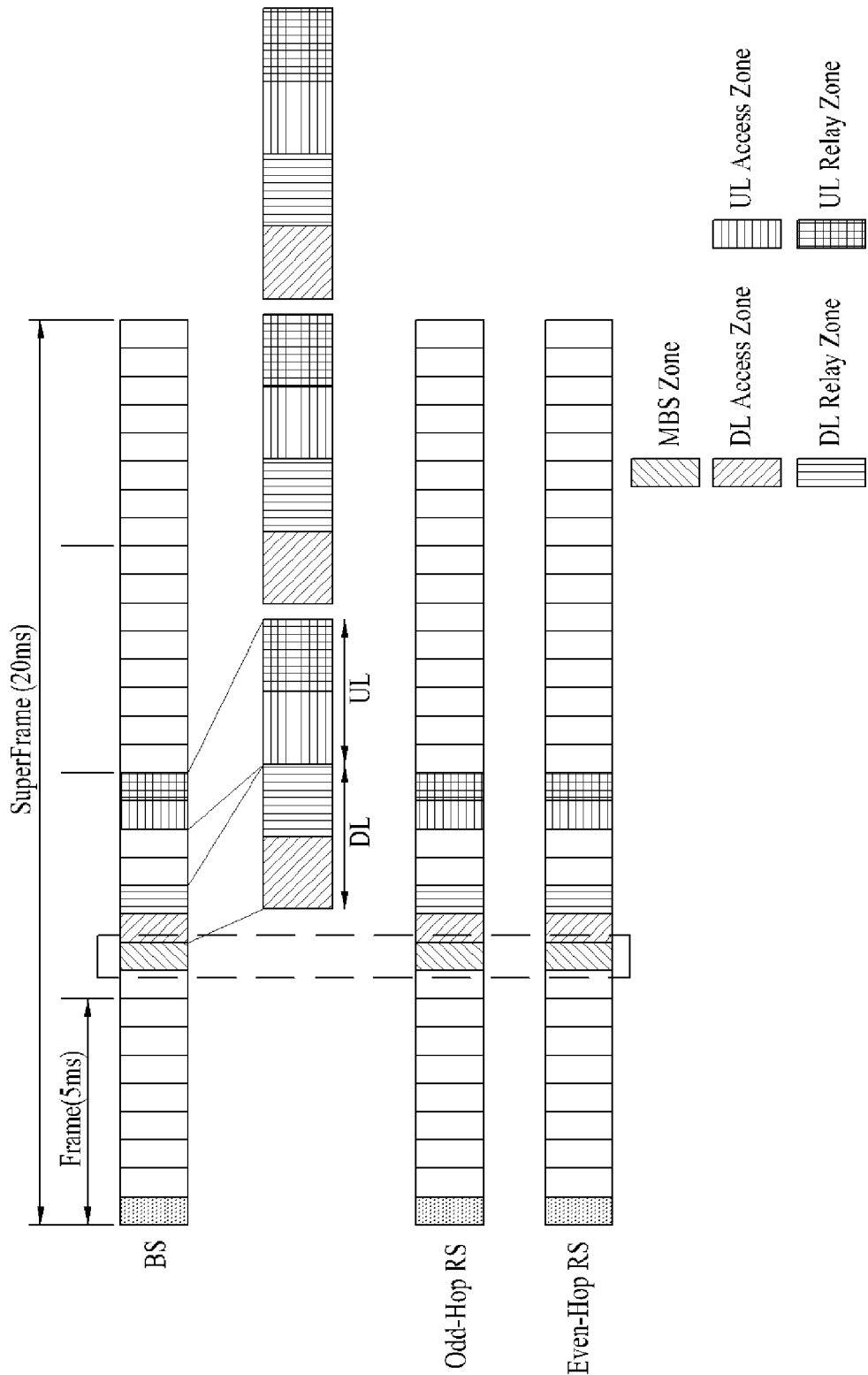
FIG. 8 is a diagram illustrating an example of a case where a MBS zone is allocated, in accordance with another embodiment of the present invention.

FIG. 8 is a diagram illustrating an example of a case where a MBS zone is allocated, in accordance with another embodiment of the present invention.

One superframe includes four frames. One frame has a size of 5 ms, and includes one or more subframes. In this case, it is preferable that one frame includes eight subframes. Among the eight subframes, successive five subframes can be used as downlink subframes, and the other three subframes can be used as uplink subframes.

In FIG. 8, it is assumed that the MBS zone allocated to the base station and the MBS zones allocated from the odd-hop RS and the even-hop RS are the same as one another. Since the MBS is a uni-directional broadcast service, even though the respective relay frame structures are different from each other, it is preferable that the base station and the relay station provide the MBS to the mobile station or the subordinate RS in the same subframe through the same resource zone at the same time. According to a modified embodiment of the present invention, the MBS can be served at the same time of the super frame headers of the base station and the relay station.

In the embodiments of the present invention, the MBS zone can be changed by the base station. If the MBS zone is changed, the base station can transmit the changed MBS zone to the subordinate RS. Also, the base station can provide the MBS to the changed MBS zone after receiving ACK response message to the changed MBS zone from the subordinate RS.

In the embodiments of the present invention, even if the subordinate RS is managed by distributed scheduling, the MBS zone can be managed by centralized scheduling of the base station. Also, the base station can broadcast MBS zone information through the BCH, and the subordinate RS can broadcast MBS zone information through the BCH of the RS in case of "non-transparent".

According to another embodiment of the present invention, the mobile station and the base station (FBS, MBS) through which the aforementioned embodiments of the present invention can be performed will be described.

The mobile station can be operated as a transmitting side in the uplink, and can be operated as a receiving side in the downlink. Also, the base station can be operated as a receiving side in the uplink, and can be operated as a transmitting side in the downlink. Namely, the mobile station and the base station can include a transmitting side and a receiving side to transmit information or data.

The transmitting side and the receiving side can include a processor, a module, a part, and/or a means for performing the embodiments of the present invention. Particularly, the transmitting side and the receiving side can include a module (means) for encoding a message, a module for decoding the encoded message, and an antenna for transmitting and receiving the message. An example of the transmitting side and the receiving side will be described with reference to FIG. 9.

Figure 9:
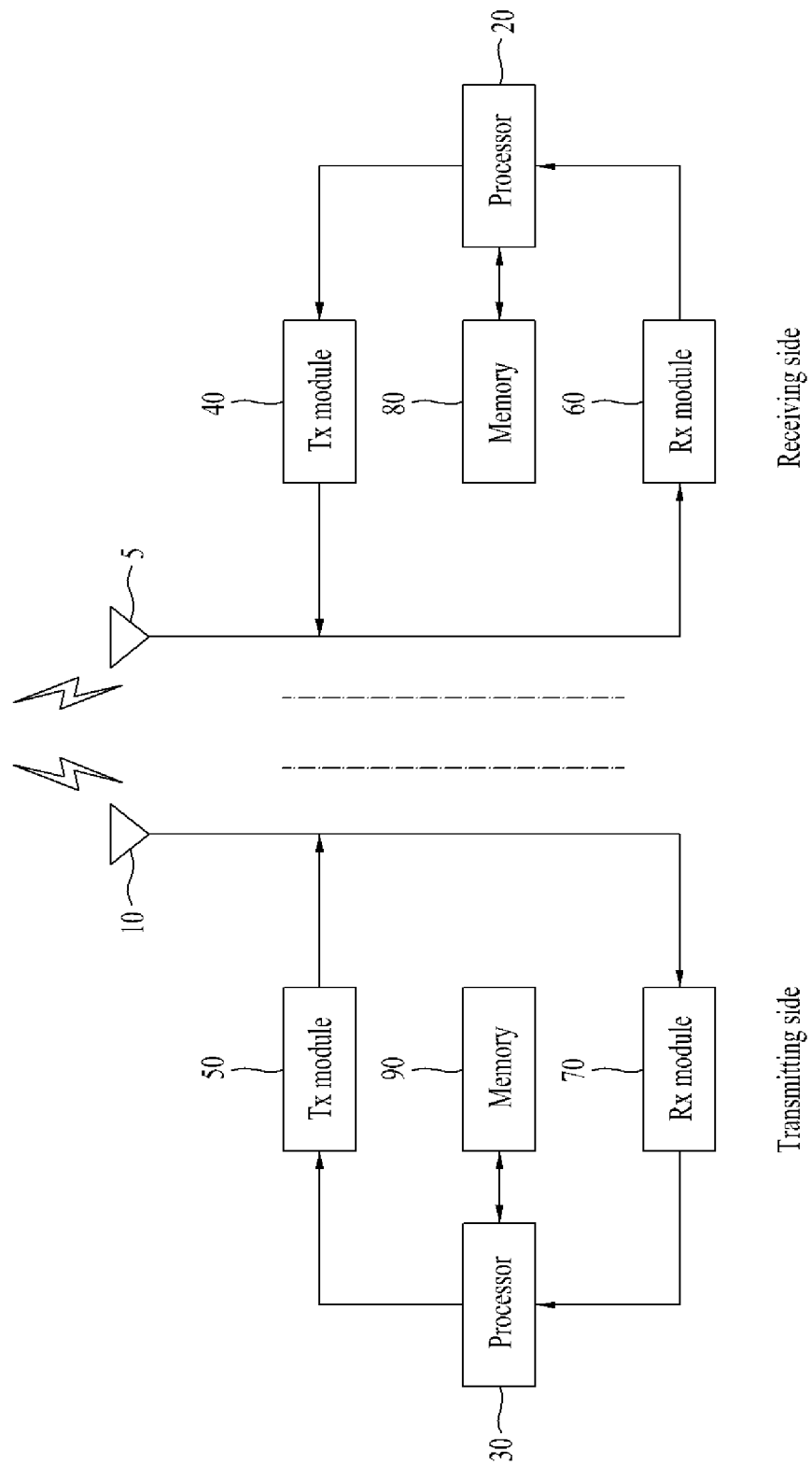
FIG. 9 is a block diagram illustrating an example of a transmitting side and a receiving side in accordance with another embodiment of the present invention.

FIG. 9 is a block diagram illustrating an example of a transmitting side and a receiving side in accordance with another embodiment of the present invention.

Referring to FIG. 9, a left side illustrates a structure of the transmitting side, and a right side illustrates a structure of the receiving side. The transmitting side and the receiving side respectively include an antenna 5, 10, a processor 20, 30, a Tx module 40, 50, an Rx module 60, 70, and a memory 80, 90. The respective modules of the transmitting side perform corresponding functions of those of the receiving side.

The antenna 5, 10 serves to transmit a signal generated by the Tx module 40, 50 to the outside or receive a radio signal from the outside to transfer the radio signal to the Rx module 60, 70. If a MIMO antenna function is supported, two or more antennas may be provided.

The processor 20, 30 generally controls the whole operation of the transmitting side or the receiving side. Particularly, processor 20, 30 can perform a controller function for performing the aforementioned embodiments of the present invention, a medium access control (MAC) frame variable control function according to service characteristics and radio wave condition, a handover function, an authentication and encryption function, etc.

Particularly, the processor of the mobile station can perform general control for receiving MBS data from the base station BS or the relay station RS using the MBS zone allocation information (MBS_Alloc-IE) described in the embodiments of the present invention.

For example, the processor can control the Tx module to receive a message, which includes one or more of the preamble, the BCH and the SCH, from the base station or the relay station, and then can determine the MBS zone to which the MBS data are transmitted from the base station or the relay station using the MBS zone allocation information included in the received message. Afterwards, the processor can control the Rx module to receive the MBS data from the base station or the relay station at the time corresponding to the MBS zone.

For another example, the processor can control the Rx module to receive the changed MBS zone allocation information from the base station and determine the changed MBS zone using the received information. As a result, the processor can control the Rx module to receive the MBS data from the base station or the relay station through the resource corresponding to the changed MBS zone.

Also, the processor of the base station can allocate uplink resources required for the mobile station by analyzing the MAC message or data transmitted from the mobile station, and can generate an uplink grant for indicating allocation details to the mobile station to perform scheduling for transmitting the uplink grant. Moreover, the processor of the base station can allocate identifier such as STID and FID, which is required for the mobile station, and can generate a message, which includes frame offset information and/or zone allocation information, to transmit the message to the mobile station.

The Tx module 40, 50 performs predetermined coding and modulation for the data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (in case of the mobile station, UL grant allocated from the base station, system information, STID, FID, operation time, MBS zone allocation information, and frame offset information). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Meanwhile, the base station can perform a controller function for performing the aforementioned embodiments of the present invention, orthogonal frequency division multiple access (OFDMA) packet scheduling, time division duplex (TDD) packet scheduling and channel multiplexing function, medium access control (MAC) frame variable control function according to service characteristics and radio wave condition, quick traffic real-time control function, handover function, authentication and encryption function, packet modulation and demodulation function for data transmission, quick packet channel coding function, and real-time modem control function through at least one of the aforementioned modules, or can further include a separate means, module or part for performing the above functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method of providing a multicast and broadcast service (MBS) in a multi-hop relay system, the method comprising:
   transmitting a first message including allocation information of a first MBS zone, which is allocated in a downlink frame for a base station (BS) to provide a first MBS by the base station (BS) to a relay station (RS);
   receiving a second message including information as to whether a second MBS zone in a downlink frame for the relay station corresponding to the first MBS zone is used and delay time information for providing a second MBS simultaneously with the first MBS of the base station from the relay station in response to the allocation information; and
   providing the first MBS via the first MBS zone which is allocated in the downlink frame for the BS based on the information included in the second message,
   wherein the downlink frame for the base station has a different zone allocation from a zone allocation of the downlink frame for the relay station,
   wherein the downlink frame for the relay station includes a downlink transmit zone, a downlink receive zone, and a gap, and the downlink frame for the base station includes a downlink access zone and a downlink relay zone,
   wherein the first MBS zone and the second MBS zone are allocated to the same time and same frequency region in each of the downlink frames for the base station and the relay station, and
   wherein the first MBS is provided simultaneously with the second MBS to each mobile station connected to the base station and the relay station.

2. The method of claim 1, wherein the allocation information includes an offset field indicating the difference between a beginning of a specific frame and a beginning of the first MBS zone, a first number field indicating a number of symbols allocated to the first MBS zone, and a second number field indicating a number of subframes allocated to the first MBS zone.

3. The method of claim 1, wherein the allocation information includes a first MBS subframe field indicating a subframe where the first MBS zone begins, and a second number field indicating a number of subframes allocated to the first MBS zone.

4. The method of claim 1, wherein the allocation information includes a frame number field indicating a frame including the first MBS zone, and a subframe number field indicating a subframe where the first MBS zone is allocated.

5. The method of claim 1, when the first MBS zone is changed, further comprising transmitting a third message including changed allocation information of the changed MBS zone.

6. The method of claim 5, further comprising providing the first MBS to the relay station via the changed MBS zone indicated by the changed allocation information.

7. The method of claim 6, further comprising receiving an acknowledgement signal to the third message from the relay station.

8. A method of providing a multicast and broadcast service (MBS) in a relay station that supports a multi-hop relay, the method comprising:
   receiving a first message including allocation information of a first MBS zone, which is allocated in a downlink frame for a base station (BS) to provide a first MBS by the base station in a relay station (RS);
   transmitting a second message including information as to whether a second MBS zone in a downlink frame for the relay station corresponding to the first MBS zone is used and delay time information for providing a second MBS simultaneously with the first MBS of the base station to the base station in response to the allocation information;
   receiving the first MBS via the first MBS zone, which is allocated in the downlink frame for the BS based on the information included in the second message from the base station; and
   relaying the second MBS corresponding to the first MBS to the mobile station via the second MBS zone,
   wherein the downlink frame for the base station has a different zone allocation from a zone allocation of the downlink frame for the relay station,
   wherein the downlink frame for the relay station includes a downlink transmit zone, a downlink receive zone, and a gap, and the downlink frame for the base station includes a downlink access zone and a downlink relay zone,
   wherein the first MBS zone and the second MBS zone are allocated to the same time and same frequency region in each of the downlink frames for the base station and the relay station, and
   wherein the first MBS is provided simultaneously with the second MBS to each mobile station connected to the base station and the relay station.

9. The method of claim 8, when the base station changes the first MBS zone to a new MBS zone, further comprising receiving a third message from the base station, the third message including allocation information of the new MBS zone.

10. The method of claim 9, further comprising:
    receiving the first MBS from the base station via the new MBS zone; and
    relaying the second MBS corresponding the first MBS to the mobile station via a new second MBS zone in the downlink frame for the RS corresponding to the new MBS zone.

11. The method of claim 10, wherein the allocation information includes an offset field indicating a difference between a beginning of a specific frame and a beginning of the first MBS zone, a first number field indicating a number of symbols allocated to the first MBS zone, and a second number field indicating a number of subframes allocated to the first MBS zone.

12. The method of claim 10, wherein the allocation information includes a first MBS subframe field indicating a subframe where the first MBS zone begins, and a second number field indicating a number of subframes allocated to the first MBS zone.

13. The method of claim 10, wherein the allocation information includes a frame number field indicating a frame including the first MBS zone, and a subframe number field indicating a subframe where the first MBS zone is allocated.

* * * * *